United States Patent [19]
Jade et al.

[11] Patent Number: 6,061,797
[45] Date of Patent: May 9, 2000

[54] OUTSIDE ACCESS TO COMPUTER RESOURCES THROUGH A FIREWALL

[75] Inventors: Prashanth Jade, Delray Beach; Victor Stuart Moore, Boynton Beach, both of Fla.; Arun Mohan Rao, Dallas, Tex.; Glen Robert Walters, Sebring, Fla.

[73] Assignee: International Business Machines Corporation, Armonk, N.Y.

[21] Appl. No.: 09/132,915

[22] Filed: Aug. 12, 1998

Related U.S. Application Data

[63] Continuation of application No. 08/731,800, Oct. 21, 1996, Pat. No. 5,944,823.

[51] Int. Cl.$^7$ ............................. G06F 12/14; G06F 13/16; H04L 29/06; H04L 9/32
[52] U.S. Cl. ............................. 713/201; 709/229; 380/25
[58] Field of Search .................................. 709/218, 230, 709/217, 229, 749, 227, 207, 104; 345/331; 707/10, 9, 6, 8; 382/115; 235/380; 713/201; 380/23; 710/200; 350/201, 25; 711/203, 163

[56] References Cited

U.S. PATENT DOCUMENTS

| | | | |
|---|---|---|---|
| 5,283,828 | 2/1994 | Sauders et al. | 380/4 |
| 5,455,953 | 10/1995 | Russell | 395/739 |
| 5,481,715 | 1/1996 | Hamilton et al. | 395/700 |
| 5,548,646 | 8/1996 | Aziz et al. | 380/23 |
| 5,826,014 | 10/1998 | Colly et al. | 713/201 |

FOREIGN PATENT DOCUMENTS

WO 97 16911   5/1997   WIPO .

OTHER PUBLICATIONS

Cheswick and Bellovin: "Firewalls and Internet Security, repelling the Willy Hacker"; Apr. 1994, Addison–Wesley Publishing Company; pp. 86 to 106.

Bryan J: "Firewalls for Sale"; BYTE, vol. 20, No. 4, Apr. 1, 1995; pp. 99/100, 102, 104.

Ted Doty: "A firewall Overview"; CONNEXIONS, vol. 9, No. 7, Jul. 1, 1995; pp. 20–23.

(List continued on next page.)

*Primary Examiner*—Daniel H. Pan
*Attorney, Agent, or Firm*—Richard A. Tomlin; Robert Lieber

[57] ABSTRACT

A firewall isolates computer and network resources inside the firewall from networks, computers and computer applications outside the firewall. Typically, the inside resources could be privately owned databases and local area networks (LAN's), and outside objects could include individuals and computer applications operating through public communication networks such as the Internet. Usually, a firewall allows for an inside user or object to originate connection to an outside object or network, but does not allow for connections to be generated in the reverse direction; i.e. from outside in. The disclosed invention provides a special "tunneling" mechanism, operating on both sides of a firewall, for establishing such "outside in" connections when they are requested by certain "trusted" individuals or objects or applications outside the firewall. The intent here is to minimize the resources required for establishing "tunneled" connections (connections through the firewall that are effectively requested from outside), while also minimizing the security risk involved in permitting such connections to be made at all. The mechanism includes special tunneling applications, running on interface servers inside and outside the firewall, and a special table of "trusted sockets" created and maintained by the inside tunneling application. Entries in the trusted sockets table define objects inside the firewall consisting of special inside ports, a telecommunication protocol to be used at each port, and a host object associated with each port. Each entry is "trusted" in the sense that it is supposedly known only by individuals authorized to have "tunneling" access through the firewall from outside.

2 Claims, 2 Drawing Sheets

OTHER PUBLICATIONS

Bellovin S M et al: "Network Firewalls" IEEE Communications Magazine, vol. 32, No. 9, Sep. 1, 1994, pp. 50–57B.

Newman D et al: Can Firewalls Take the Heat?; Data Communications, vol. 24, No. 16, Nov. 21, 1995; pp. 71–78, 80.

Noritoshi Demizu et al: "DDT—A Versatile Tunneling Technology"; Computer Networks and ISDN Systems, vol. 27, No. 3, Dec. 1, 1994, pp. 493–502.

PCT International Preliminary Examination Report, Oct. 2, 1997, International Application No. PCT/GB97/02712.

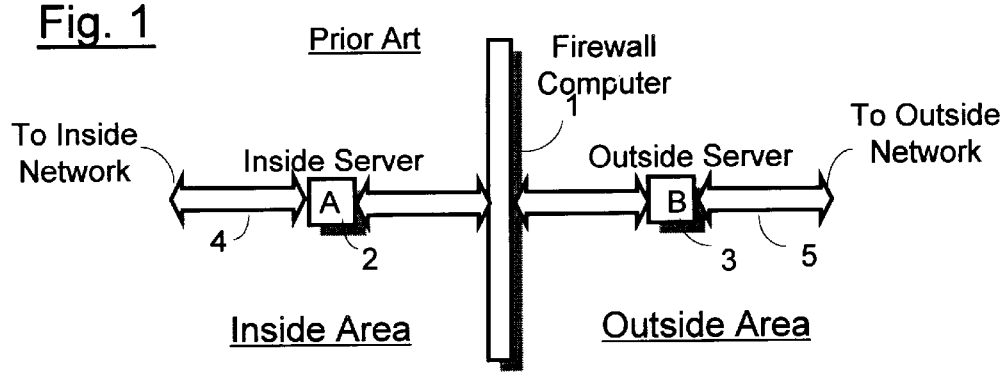
Fig. 1 Prior Art
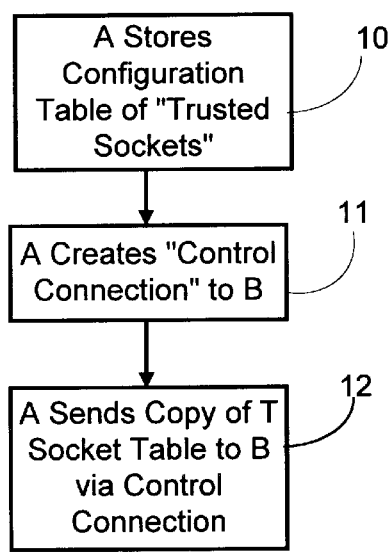
Fig. 2
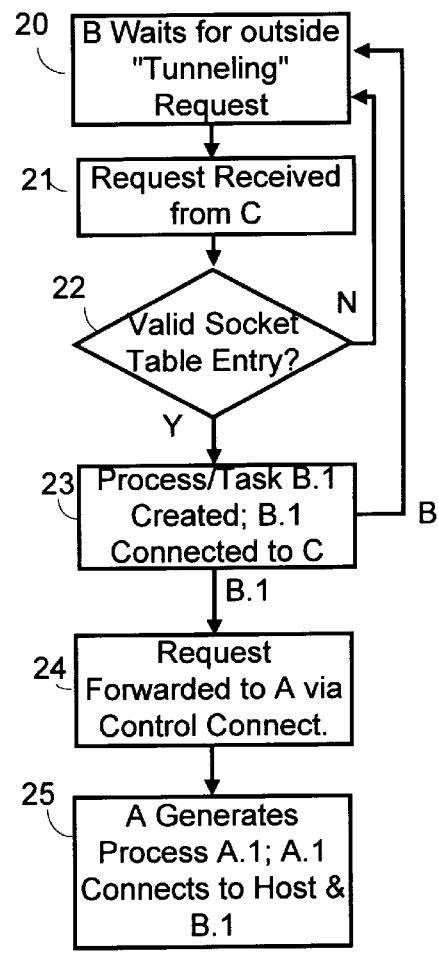
Fig. 3
Fig. 4

OUTSIDE ACCESS TO COMPUTER RESOURCES THROUGH A FIREWALL

This is a continuation under 37 CFR 1.53(b) of parent patent application Ser. No. 08/731,800 filed Oct. 21, 1996, now U.S. Pat. No. 5,944,823. The disclosure of that parent application is hereby incorporated into this application by reference.

FIELD OF THE INVENTION

This invention concerns provision of access to resources of a computer system or network, to objects outside a security firewall, in response to requests from respective objects.

BACKGROUND OF THE INVENTION

A firewall is a security system (hardware and/or software) that isolates resources of a computer system or network from objects outside of the system or network. Isolated resources are characterized as inside the firewall, and external equipment is considered outside the firewall. Typically, a firewall serves as a security enclosure around a private local area network (LAN) of computers and associated peripherals.

Generally, a firewall allows for inside objects to request and receive connections to outside objects (e.g. for inside applications to access outside internet nodes, etc.), but prevents outside objects from originating similar connections.

There are instances where it is desired to allow for objects outside a firewall to have access to inside resources, subject to restrictions that would not fully defeat the security purpose of the firewall. For example, it might be desirable to allow employees of a company owning resources inside the firewall to "telecommute" over public networks (such as the telephone network or that network and Internet points of access, etc.), from homes remote from their employer's place(s) of business (or from remote locations while on business trips or vacations). For that purpose then it would be desirable to permit such "trusted" individuals to be able to initiate access outside a firewall to resources inside the firewall (e.g. the employer's private databases, etc.).

To our knowledge, such access, in response to outside initiation or request, has been provided in the past by providing duplicate servers and database stores, both inside and outside the firewall, or by means of other arrangements that add considerable expense to maintenance of the firewall per se. Consider, for example, the costs of such outside duplication, or other process, in relation to massive and frequently updated databases stored inside the firewall. The present invention seeks to provide the desired outside access without unnecessary outside duplication of objects or resources inside the firewall.

SUMMARY OF THE INVENTION

In accordance with the invention, means are provided inside and outside a firewall for cooperatively producing tunneling effects, in response to certain types of requests initiated by objects outside the firewall, which effects result in creation of connections between such outside objects and resources inside the firewall. Connections so created have the unique property that they are effectively created from "inside out" as if they were requests originating from objects inside the firewall to destinations outside the firewall.

The "types of requests" accommodated by such "tunneling" means are requests addressed to what are presently termed "trusted sockets". Trusted sockets are entries in a table of trusted sockets that is created and maintained exclusively inside the firewall. Each entry in that table includes the address of a "trusted" port, a protocol (e.g. a telecommunication protocol such as TCP/IP, NNTP, etc.) pre-associated with that address, and the identity of a host object inside the firewall (e.g. a host computer or a host application). Thus, it is understood that in order for an individual and/or object outside the firewall to initiate such a request that individual must be entrusted with the information that represents a trusted socket entry that is currently valid.

The table of trusted sockets is created and maintained by a "tunneling application" running on an inside interface server (under control of appropriately authorized individuals having direct access to that server) that interfaces between this tunneling application and all other "accessible" objects/resources inside the firewall (including other applications running on the inside interface server). The inside interface server also establishes a "control connection" to an outside interface server which interfaces between the firewall and all objects outside the firewall. The control connection is accessible only to the tunneling application running on the inside interface server and a corresponding tunneling application running on the outside interface server; i.e. it is not directly accessible to any other applications running on these interfaces servers, and is totally inaccessible to both inside and outside objects not residing on these servers.

A copy of the trusted sockets table is transferred from the inside interface server to the outside interface server; e.g. when the table is created and/or altered, or at special times of day, etc.

When an outside object, that is currently not connected through the firewall, originates a request reaching the outside interface server, the tunneling application on that server determines if the request is directed to a trusted socket entry that is currently valid. If it is not so directed, the request is ignored. If the request is to a trusted socket, the request is passed over the control connection to the tunneling application on the inside interface server. Concurrently, a process (or task) associated with the request is generated in the outside interface server, and an outside connection is established between that process/task and the requesting object.

Upon receiving the request, the inside tunneling application also may be required to verify that the request is to a currently valid trusted socket and disallow the request if it is not. If the request is to a currently valid trusted socket, the inside tunneling application generates (or "spawns") an inside process associated with the request. Then the inside tunneling application: (a) generates connections between the inside resource associated with the port and host identity of the "requested" trusted socket entry and the inside interface server; and (b) communicating over the control connection with the outside tunneling application and a computer controlling the firewall itself, generates a connection through the firewall between the tasks generated/spawned on both the inside and outside interface servers. The connections generated/spawned by the inside and outside tunneling applications are separate from the control connection, and useful to carry data (usually in packet format defined by the trusted socket protocol) bidirectionally between the outside object that originated the request and the inside object targeted by the request.

These and other features, advantages, objectives and benefits of the present invention will be more fully understood by considering the following detailed description and claims.

BRIEF DESCRIPTION OF THE DRAWINGS

FIG. 1 is a schematic of a typical firewall environment in which the present invention can be applied.

FIG. 2 is a flow diagram illustrating the creation and handling of the trusted socket table mentioned above.

FIG. 3 is a flow diagram illustrating the firewall tunneling process of the present invention.

FIG. 4 illustrates a preferred form of the trusted sockets table mentioned above.

DETAILED DESCRIPTION

Figure 5:
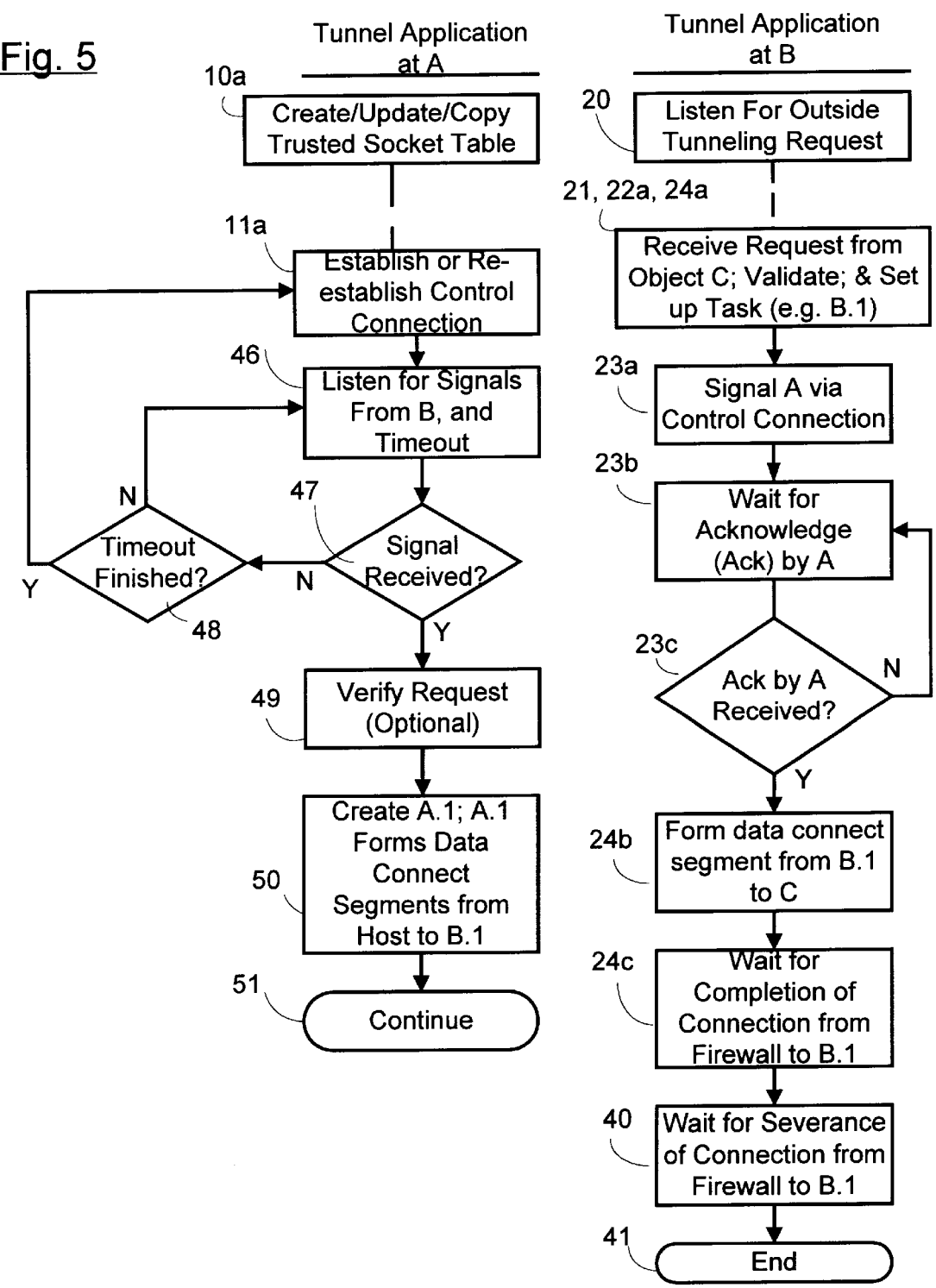
FIG. 5 is a flow diagram for explaining details of tunneling application operations inside and outside of a firewall, in accordance with the present invention.

FIG. 1 illustrates a typical firewall environment for application of the present invention. Firewall computer 1 maintains the firewall security function in accordance with presently commonplace procedures. The functions of this computer, other than those involving extending connections from objects inside the firewall to objects outside the firewall, are transparent to (and in essence not relevant to) the present invention. Interface servers 2 and 3 (labelled servers A and B respectively) operate respectively inside and outside the firewall created by 1. Server A interfaces between the firewall and objects (software applications, hardware entities, etc.) inside the firewall, including objects in Server A itself. Server B interfaces between the firewall and objects outside the firewall, including objects in server B itself.

In a typical firewall usage environment, server A connects to a network inside the firewall (e.g. a private local area network) via a connection shown at 4, and server B connects to a network outside the firewall (e.g. the Internet) via a connection shown at 5.

In applying the present invention to this environmental configuration, servers A and B are provided with "tunneling" software applications and store copies of a "trusted socket" table. These entities—the tunneling applications and the trusted socket table—are considered unique to the present invention and described herein.

FIGS. 2 and 3 describe (tunneling) processes performed at servers A and B in furtherance of the present invention.

As shown at 10, in FIG. 2, a trusted socket table (which is described below in reference to FIG. 4) is created in and stored at server A (or a store readily accessible to that server). As shown at 11, server A creates a special "control connection" to server B through the firewall (computer), and passes a copy of the trusted sockets table to server B over the control connection. This control connection, also considered part of the present invention, is used by the above-mentioned tunneling applications to effectively inter-communicate, and thereby form other connections (hereinafter termed "data connections") between objects inside and outside the firewall, in response to requests received from outside objects.

Segments of these data connections extending through the firewall are entirely separate from the control connection used in their formation, and are always formed under control of processes running inside the firewall. For an outside request to give rise to formation of a data connection to an inside object, the request must be directed to an entry in the trusted sockets table, and validated as such. Outside requests found to be invalid are ignored, so that the firewall and its inside resources are effectively invisible to and inaccessible to outside requestors having invalid request information.

Conversely, it should be understood that valid requests are issuable only at the direction of individuals having privileged knowledge of currently valid entries in the trusted sockets table (e.g. telecommuting employees of the owner of the inside resources, etc.).

FIG. 3 describes tunneling functions performed at servers A and B, after B has received and stored its copy of the trusted sockets table sent by A.

As shown at 20, (the tunneling application in) server B waits to receive an outside request that effectively calls for a tunneling operation; i.e. creation of a data connection between an inside "host" object designated in the request and the outside object from which the request was sent. Upon receiving a request (21, FIG. 3), (the tunneling application at) B checks to verify that the request is a valid one (decision 22, FIG. 3). In respect to the last-mentioned function, it should be understood that server B only receives requests directed to that server, and that the tunneling application on server B only receives requests that appear to be directed to a port inside the firewall, and distinguishes those requests as valid only if they are directed to a currently valid entry in the trusted sockets table mentioned earlier.

If the request is invalid it is ignored, and (the application at) server B resumes waiting for a request. However, if the request is valid, (the tunneling application at) server B creates a process or task "B.1" for handling outside elements of data transfer relative to the requesting object (23, FIG. 3). Task B.1 establishes a data connection between itself and the requesting object (also 23, FIG. 3), and forwards the request to (the tunneling application at) server $A_1$ via the control connection, along with the identity of task B.1 (24, FIG. 3).

Upon receiving a validated request, (the tunneling application at) server A generates a process or task A.1, for handling inside aspects of the transmission of data between the outside requesting object and a host object identified in the request (25, FIG. 3; the latter object being a component of a trusted socket designation as explained below). Task A.1 creates data connection segments from the host object to the firewall computer (also 25, FIG. 3), and instructs the firewall computer to form a connection to B.1 (also 25, FIG. 1); thus completing a data connection between the inside host object and the outside requesting object. It should be appreciated that this data connection may require buffers, in servers A and B and the firewall computer, of a size determined by the protocol of data transmission (discussed further below), and the required speed of (packet) transfer for that protocol.

The form of the trusted sockets table is illustrated in FIG. 4. Examples of 2 specific entries are shown at 30, and additional entries are implied at 31 by dotted lines extending downward from the second entry. Each entry consists of a port number, information defining a transmission protocol (usually, a burst packet transfer protocol), and information identifying a host object. The port number is an address inside the firewall assigned to the host object. As examples of protocols, the first two entries in the table list NNTP (Network News Transport Protocol) and HTTP (HyperText Transport Protocol).

FIG. 5 shows in finer detail operations performed by the tunneling applications at interface servers A and B. Operations that are the same as operations shown in FIGS. 2 and 3 are identified by identical numerals. Operations that are parts of, or differ in some respect from, operations shown in FIGS. 2 and 3 are identified by the same numbers followed by letters (a, b, etc.). Other operations are identified by numbers different from those previously used.

Operation 10a at server A, a composite of operations 10 and 12 of FIG. 2, is the creation and updating (expansion, modification. etc.) of the trusted sockets table and the copying of the latter to server B. Operation 11a at server A is the establishment or (as explained below) re-establishment of the control connection between (the tunneling applications at) servers A and B. A need to reestablish the control connection arises when the connection is unintentionally broken, and the operations required to detect and respond to such occurrences are shown at 46–48 in FIG. 5 (which are discussed further below).

After receiving its copy of the trusted sockets table, (the tunneling application at) server B listens for outside requests (20, FIG. 5). When a valid outside tunneling request is received, and an associated data handling task (e.g. B.1, FIG. 3) has been created therefor (21–22a, 24a, FIG. 5), server B presents the request to server A (23a, FIG. 5), along with control signals indicating the action occurring and information identifying the task (e.g. B.1) created at B to attend to the request. Server B then waits for acknowledgement of receipt of the request from server A (23c, FIG. 5), and upon receiving such server B establishes a data connection segment from the newly created task to the requesting object (24b, FIG. 5; e.g. from B.1 to C as in FIG. 3). Server B then waits for establishment of a data connection segment from the firewall to the task just created at B (24c, FIG. 5), that occurrence implying establishment of an associated data connection segment between the host object (the one identified in the request) and server B. The tunneling process at server B is then complete until the data connection segment between the firewall and the task at B is terminated (40, FIG. 5), ending the involvement of server B in that connection and the associated request (41, FIG. 5).

Returning to consideration of tunneling actions at server A, after establishing or re-establishing the control connection, server A listens for (request forwarding) signals from B (46, FIG. 5). If a signal hasn't been received (47, FIG. 5), but a predetermined timeout interval has not elapsed since the waiting started (48, FIG. 5), server A merely continues to wait for such signal. However, if the timeout has lapsed (Yes decision at 48, FIG. 5) it is assumed that the control connection has been (unintentionally) broken, and the connection is re-established (11a repeated).

If a request is received from server B, server A may optionally perform its own validation operation (49, FIG. 5) to verify that the request is to a currently valid trusted socket. If that option is used and the request is found to be invalid, an error signal would be returned to server B instead of the acknowledgement awaited at 23b. If the option is not used, or if it is used and the request is found to be valid, server A proceeds to establish its internal task such as A.1, and the latter, as described previously, forms data connection segments from the host object to the firewall, and directs the firewall computer to extend the data connection to B.1 (50, FIG. 5). This concludes server A's involvement in the current request, freeing it to continue with other requests (51, FIG. 5).

Program Products

The foregoing tunneling applications can be delivered as a "computer readable" program product; e.g. on storage media or through communication networks. It should be understood that such product can be provided as either a single integral entity (e.g. one installed on inside server A and transferred in whole or part to outside server B), or two entities (or parts) separately installable on inside and outside servers. It also should be understood that the firewall computer is a necessary participant in the creation of data connections through the firewall.

Accordingly, we claim:

1. A tunneling software application contained on computer-readable media, said tunneling application being useful, in first and second computers connecting directly to opposite sides of a network security firewall and respectively connecting said opposite sides to first and second data communication networks, for isolating secure objects in said first network from said second network, while allowing for transfer of data through said firewall and between said first and second networks without compromising security of said secure objects in said first network; said tunneling application comprising:

first and second program segments respectively intended to run on said first and second computers; said first program segment operating to provide a data communication interface between said firewall and said first network, and said second program segment operating to provide a data communication interface between said firewall and said second network;

said first program segment comprising means for operating said first computer to create and maintain a table of trusted objects including objects associated with said secure objects in said first network; and means for operating said first computer, relative to said firewall and said second computer, to provide a copy of said table to said second computer for use by said second program segment.

2. A tunneling application in accordance with claim 1 wherein:

said first program segment comprises means for operating said first computer relative to said firewall said second computer to establish a private control connection through said firewall between said first and second computers; said private control connection being normally inaccessible to communications directed from said second network to said first network; and said second program segment comprises means for operating said second computer to receive a communication directed from said second network to said first network, verify that said received communication is addressed to a said trusted object designated in said copy of said table of trusted objects, and forward data contained in said received communication to said first program segment in said first computer through said private control connection; in a form enabling said first program segment to have said contained data delivered to a said secure object without exposing the respective secure object to access from said second network.

* * * * *